United States Patent
Lin

(10) Patent No.: US 8,061,029 B2
(45) Date of Patent: Nov. 22, 2011

(54) METHOD FOR MANUFACTURING A PISTON DEVICE

(75) Inventor: Cheng Feng Lin, Taipei (TW)

(73) Assignee: Unipoint Electric Mfg. Co., Ltd., Taipei (TW)

( * ) Notice: Subject to any disclaimer, the term of this patent is extended or adjusted under 35 U.S.C. 154(b) by 851 days.

(21) Appl. No.: 12/117,102

(22) Filed: May 8, 2008

(65) Prior Publication Data

US 2009/0277008 A1    Nov. 12, 2009

(51) Int. Cl.
*B21D 39/03*    (2006.01)
*B21K 1/18*    (2006.01)
*B23P 15/10*    (2006.01)
*B23P 19/02*    (2006.01)

(52) U.S. Cl. ............. 29/888.04; 29/888.042; 29/88.044; 29/428; 29/525

(58) Field of Classification Search ............... 29/888.04, 29/888.042, 888.044, 888.045, 428, 525
See application file for complete search history.

(56) References Cited

U.S. PATENT DOCUMENTS

| 2008/0127818 A1* | 6/2008 | Dye | 92/186 |
| 2010/0006055 A1* | 1/2010 | Garcia et al. | 123/193.6 |

\* cited by examiner

*Primary Examiner* — Alexander P Taousakis
(74) *Attorney, Agent, or Firm* — Bacon & Thomas, PLLC

(57) ABSTRACT

A method for manufacturing a piston device, comprises the following steps. Processing a first raw material to form a piston with a top surface and a bottom surface. Processing a second raw material to have the diameter of said second raw material slightly larger than the diameter of said piston. Cutting the second raw material into a plural cylinders. Mounting the annular component on the top surface or the bottom surface through the convex portion. The durability and the life cycle of the piston device can be extended by mounting the annular component onto the piston.

8 Claims, 9 Drawing Sheets

METHOD FOR MANUFACTURING A PISTON DEVICE

FIELD OF THE INVENTION

The present invention provides a method for manufacturing a piston device, and more particularly, to a method of attaching the wear resistant component to a piston.

BACKGROUND OF THE INVENTION

The principle of operation of piston within a cylinder, is driving the piston in oscillating movement to reproduce motive force by combusting the fuel, theoretically, the piston must be completely sealed with the inner wall of the cylinder, so the combustion gas is fully sealed from leaking as being effectively used to drive the piston. However, this kind of design will significantly decrease piston life due to excessive wear between the inner wall of the cylinder and piston, thus overheat. Hence the contacting surface of piston must be wear resistant to provide superior protection; such wear resistance process is coated with wear-resistant material.

However, the process for coating the surface of piston device is very complicated, it is not easy to control as to keep the surface of piston uniformly flat after applying wear resistance process in a large surface area, if the surface of piston is uneven after processed, the sealing problem would thus occurs since the piston is not completely sealed against the cylinder. And the surface of piston must completely fit in respect with the cylinder size accordingly after wear resistant process to prevent from leaking, for such reason, the difficulty level of coating wear-resistant material on the piston is inevitably increased.

According to the problem described above, the inventor of the invention herein conducted extensive research and experimentation that culminated in the successful development and design; hence a piston device thereof is addressed as the foundation and the realization for improving described problems.

SUMMARY OF THE INVENTION

A primary object of the present invention is to provide a method for manufacturing a piston device to simplify the wear resistant process.

To achieve above object, a method for manufacturing a piston device is provided, which comprises the following steps, processing a first raw material to form a piston with a top surface and a bottom surface, either the top surface or the bottom surface has a convex portion. Processing a second raw material to have the diameter of said second raw material slightly larger than the diameter of said piston. Cutting the second raw material into a plural cylinders. Drilling the cylinder to form an annular component. And mounting the annular component on the top surface or the bottom surface through the convex portion.

Another object of the present invention is to provide a method for manufacturing a piston device, which comprises the following steps, processing a first raw material of piston to form a piston with a top surface and a bottom surface, either the top surface or the bottom surface has a groove. Processing a second raw material to have the diameter of the second raw material slightly larger than the diameter of the piston. Cutting the second raw material into a plural cylinders. Processing the cylinder into a disc component, and mounting said disc component on said top surface or said bottom surface through said groove.

DETAILED DESCRIPTION OF THE PREFERRED EMBODIMENTS

The method of manufacturing piston disclosed herein is described below by way of the preferred embodiments with reference to the accompanying drawings. In the preferred embodiments, for a better understanding, like designations refer to like elements.

Figure 1:
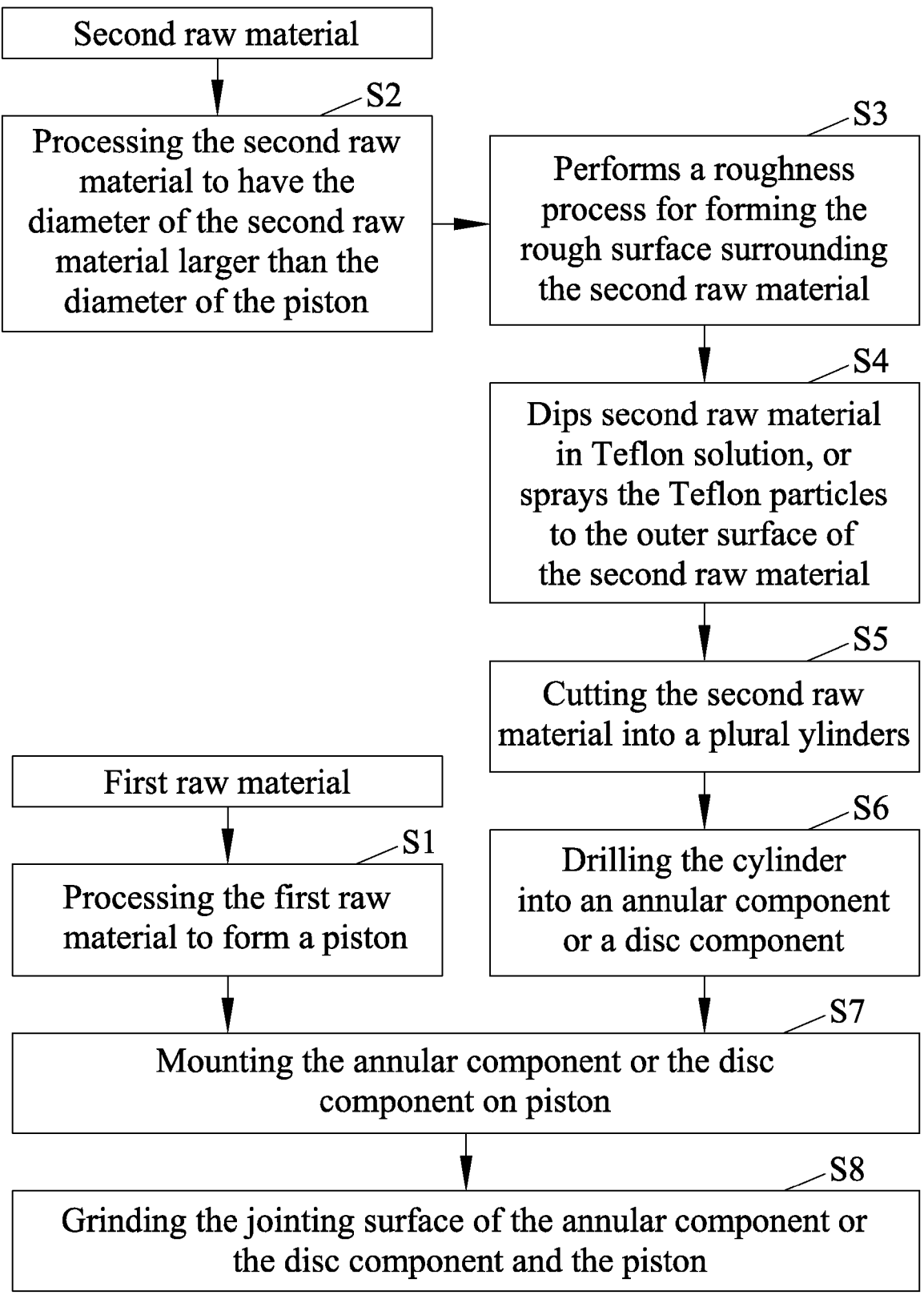
FIG. 1 is a flow chart of the method for processing the first raw material and the second raw material of the present invention.

FIG. 1 is illustrated a flow chart of method for processing the first raw material and the second raw material of the present invention. The method of processing the first raw material and second raw material comprises the following steps of:

Step S1: processing the first raw material to form a piston.

Step S2: processing the second raw material to have the diameter of the second raw material larger than the diameter of the piston.

Step S3: performing a roughness process for forming the rough surface surrounding the second raw material.

Step S4: dipping second raw material in Teflon solution, or spraying the Teflon particles to the outer surface of the second raw material.

Step S5: cutting the second raw material into a plural cylinders.

Step S6: drilling the cylinder into an annular component or a disc component.

Step S7: mounting the annular component or the disc component on piston.

Step S8: grinding the jointing surface of the annular component or the disc component and the piston.

Figure 2A:
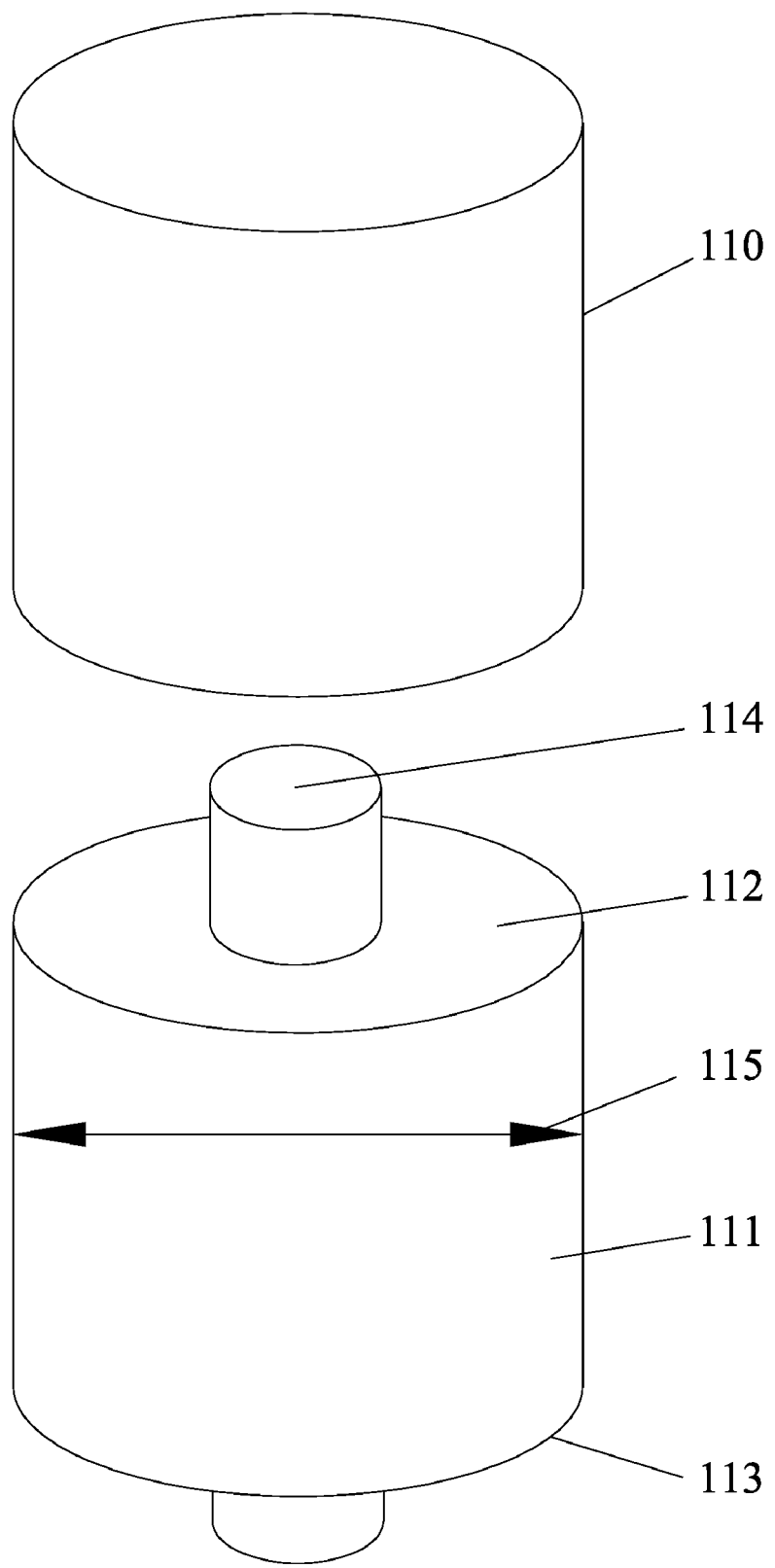
FIG. 2A is a schematic view of method for manufacturing a piston device in the first embodiment of the present invention.
Figure 2B:
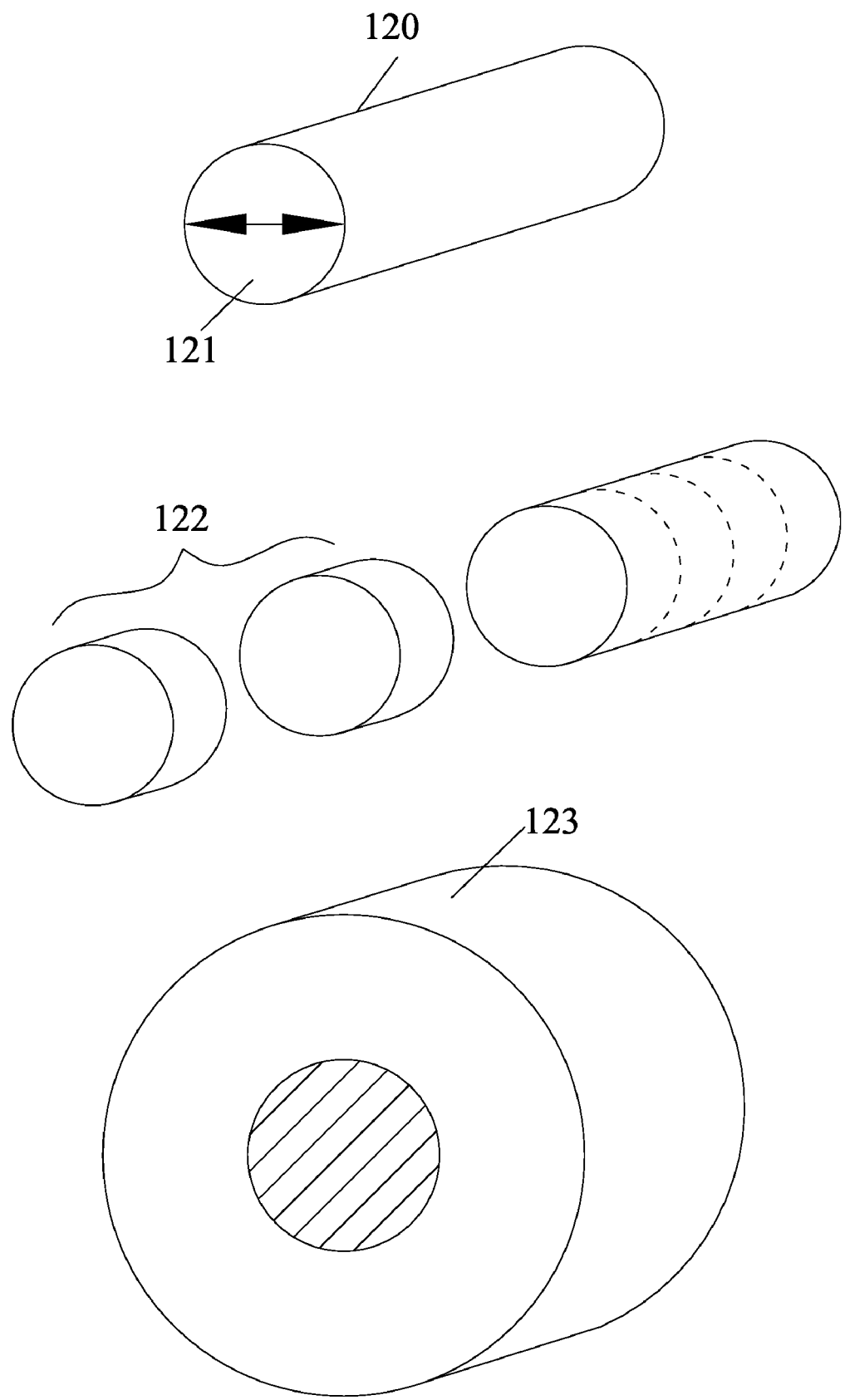
FIG. 2B is a schematic view of method for manufacturing a piston device in the first embodiment of the present invention.
Figure 2C:
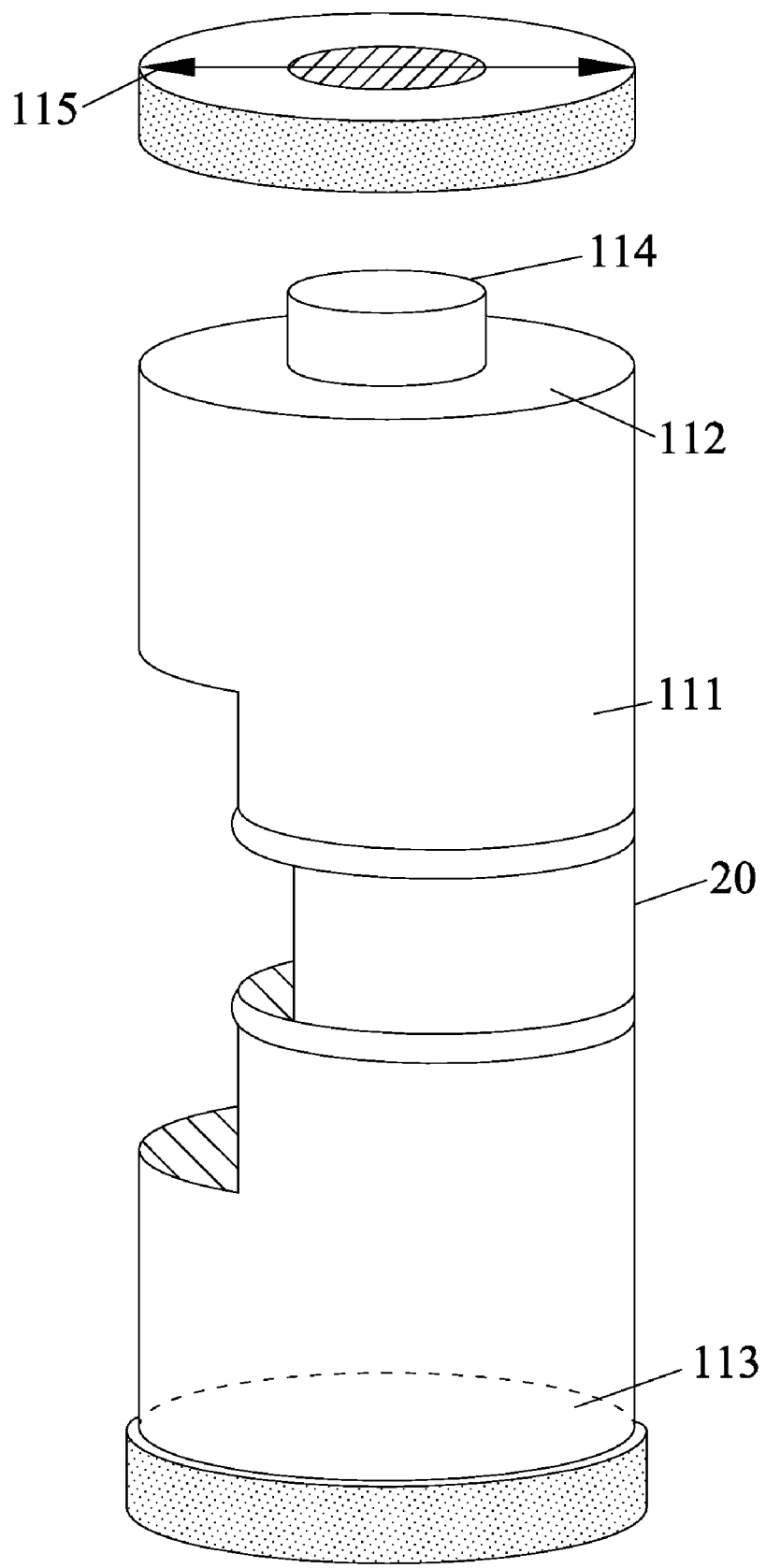
FIG. 2C is a schematic view of method for mounting the annular component on the piston through the convex portion.
Figure 2D:
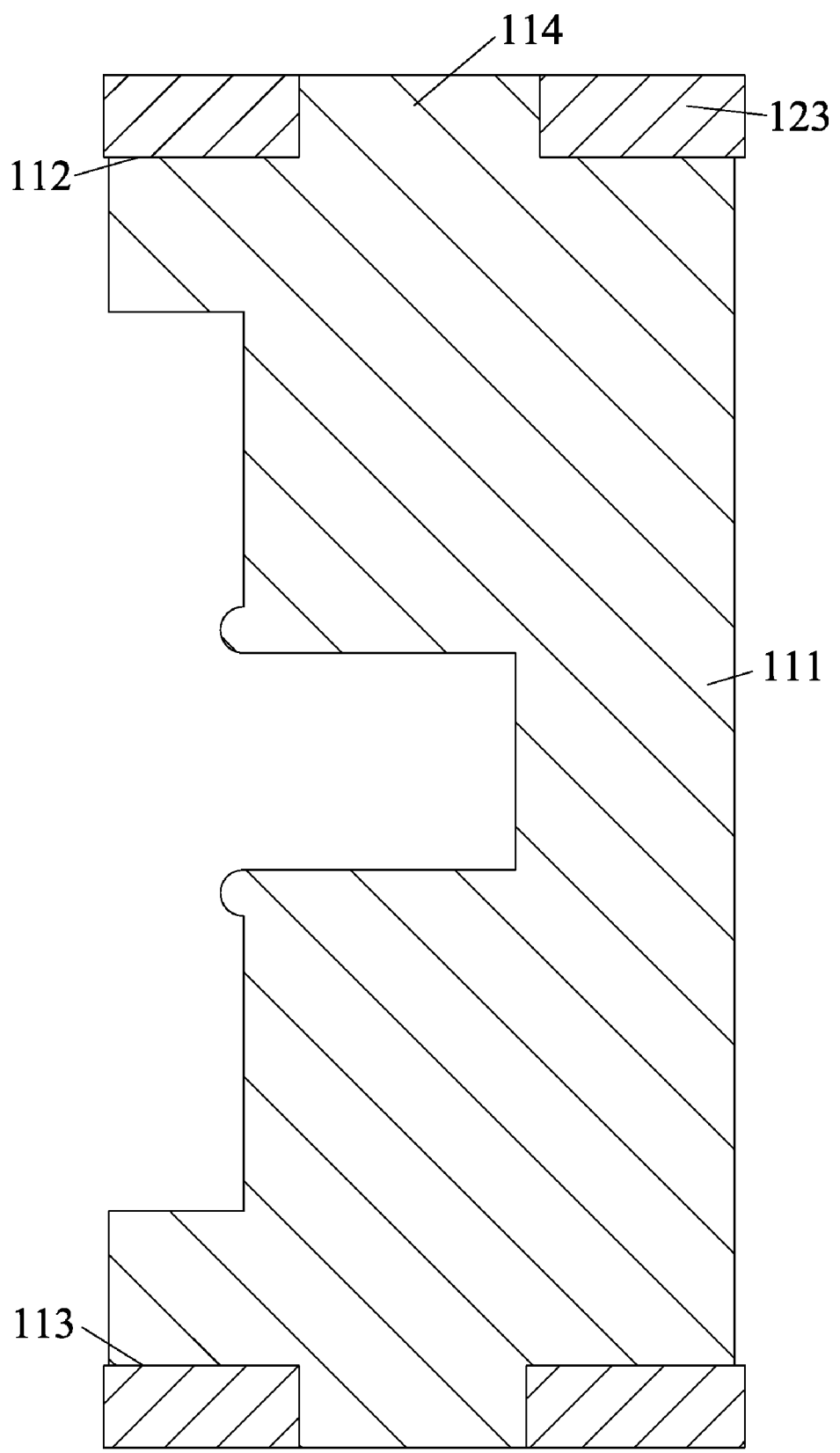
FIG. 2D is a sectional view of method for mounting the annular component on the piston through the convex portion.

FIG. 2A is illustrated a first schematic view of method for manufacturing a piston device in the first embodiment of the present invention. In FIG. 2A, the method for manufacturing a piston device comprises the steps of processing a first raw material 110 to form a piston 111, the piston 111 is associating a top surface 112 and a bottom surface 113, and either the top surface 112 or the bottom surface 113 has a convex portion 114. In FIG. 2B, the method of manufacturing a piston device is to process a second raw material 120 to have the diameter 121 of said second raw material 120 slightly larger than the diameter 115 of said piston 111, then the second raw material 120 is cut into a plurality cylinders 122. Afterwards, one of said plurality of cylinders 122 is drilled to form an annular component 123, wherein the second raw material 120 is made of Teflon, or performs a roughness process for forming the rough surface surrounding the second raw material 120, and further, dips second raw material 120 in Teflon solution, or sprays the Teflon particles to the outer surface of the second raw material 120, so as to cover the surface of second raw material 120 with a layer of Teflon. In FIG. 2C and FIG. 2D, the method of manufacturing piston device 1 mounts the annular component 123 to the top surface 112 or the bottom surface 113 by riveting the annular component 123 to the convex portion 114 tightly.

Figure 3:
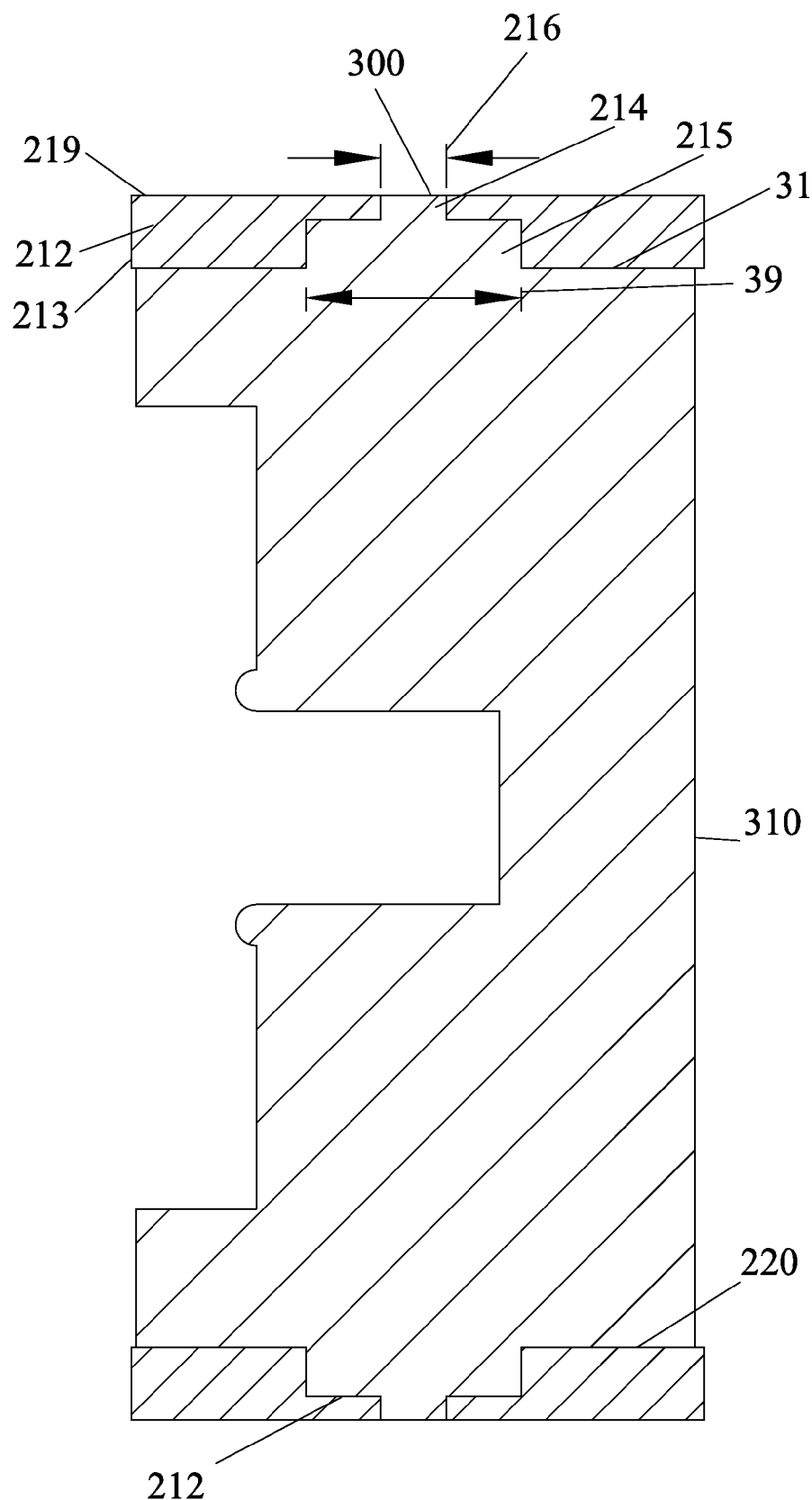
FIG. 3 is a sectional view of method for the convex portion having a first end and a second end in the second embodiment of the present invention.

FIG. 3 is illustrated a schematic view of method, the convex portion has a first end and a second end in the second embodiment of the present invention. The method for manufacturing a piston 2 differing from the method 1 is, the convex portion 212 has a first end 214 and a second end 215, the annular component 213 has a first inner diameter 216 and a second inner diameter 217 which are corresponding to the first end 214 and the second end 215 respectively. Wherein the annular component 213 mounted to the top surface 219 or the bottom surface 220 is by riveting the annular component 213 to the convex portion 212 tightly. It is intended that the invention be not limited by any of the details of the description therein but includes all the embodiments with wear resistance efficacy which fall within the scope of the appended claims.

Figure 4A:
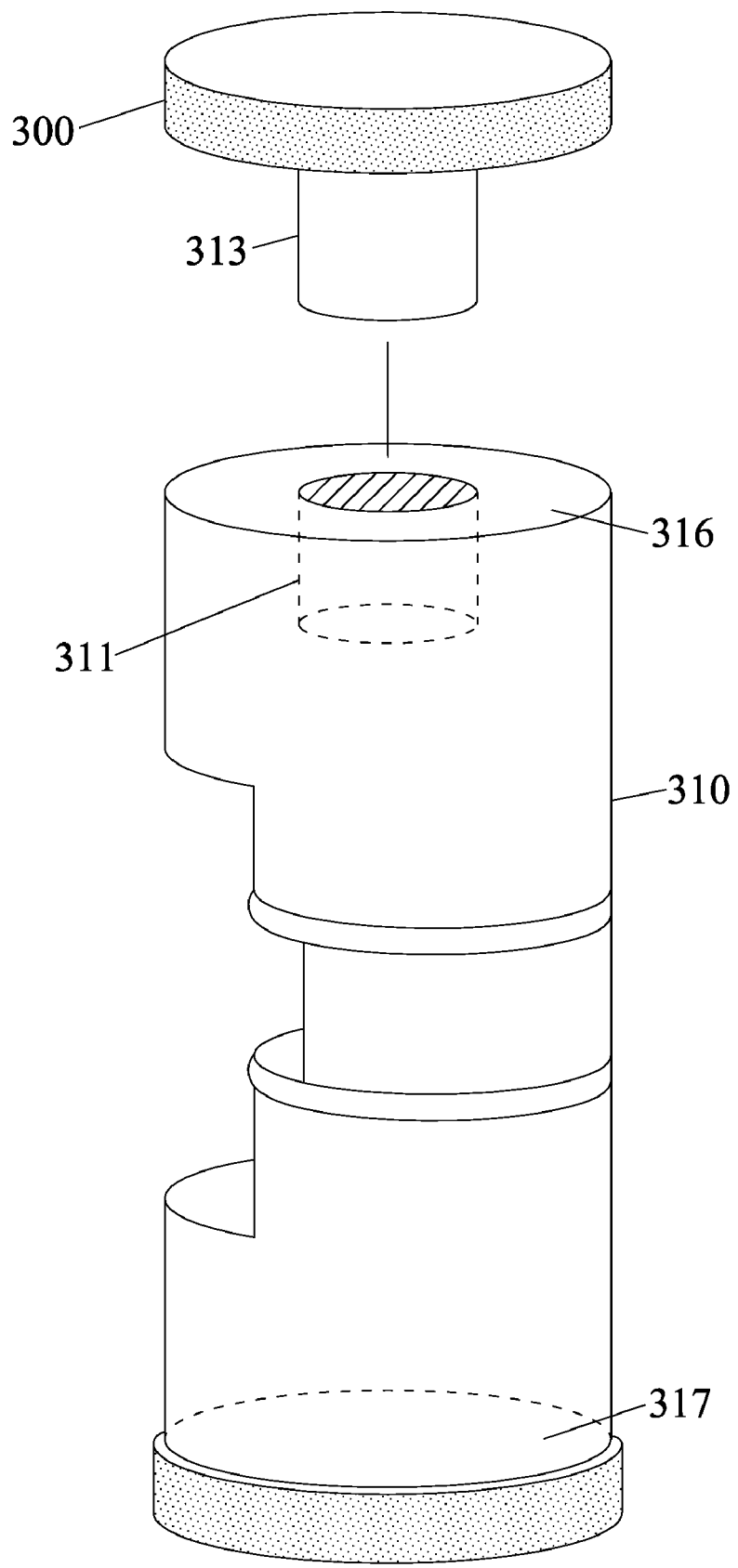
FIG. 4A is a schematic view of method for processing the second raw material into a disc component in the third embodiment of the present invention.
Figure 4B:
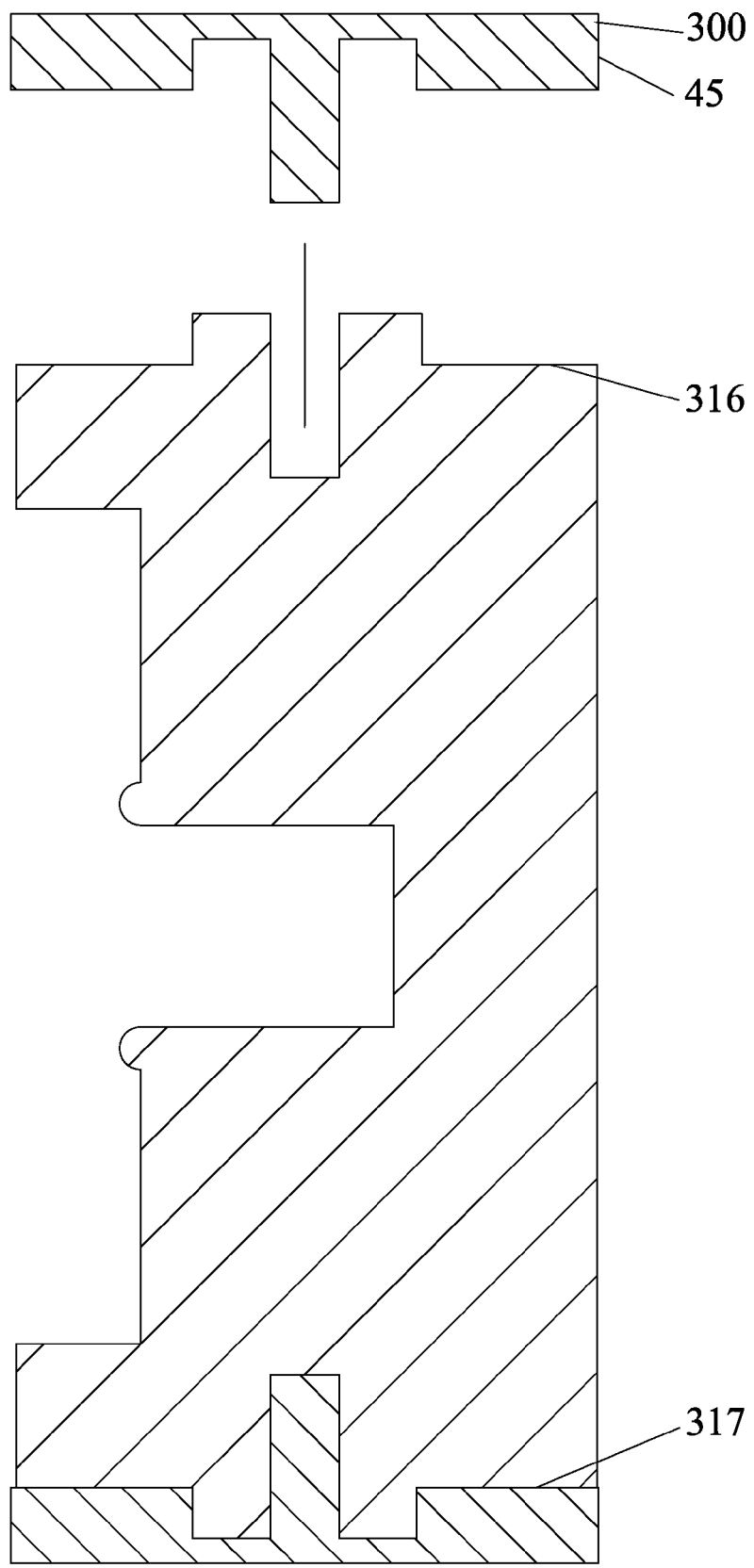
FIG. 4B is a sectional view of method for processing the second raw material into a disc component in the third embodiment of the present invention.

FIGS. 4A and 4B are illustrated schematic views of method for processing the second raw material into a disc component in the third embodiment of the present invention. The method for manufacturing a piston 3 differing from the method 1 is, either one of the top surface 316 and the bottom surface 317 of the piston device 310 has a groove 311, and the cylinder 122 is processed into a disc component 300, the disc component 300 comprises a cylindrical portion 313, Wherein the cylindrical portion 313 is riveted to the groove 311 tightly so as to have the disc component 300 mounted on the top surface 316 or the bottom surface 317.

Figure 5:
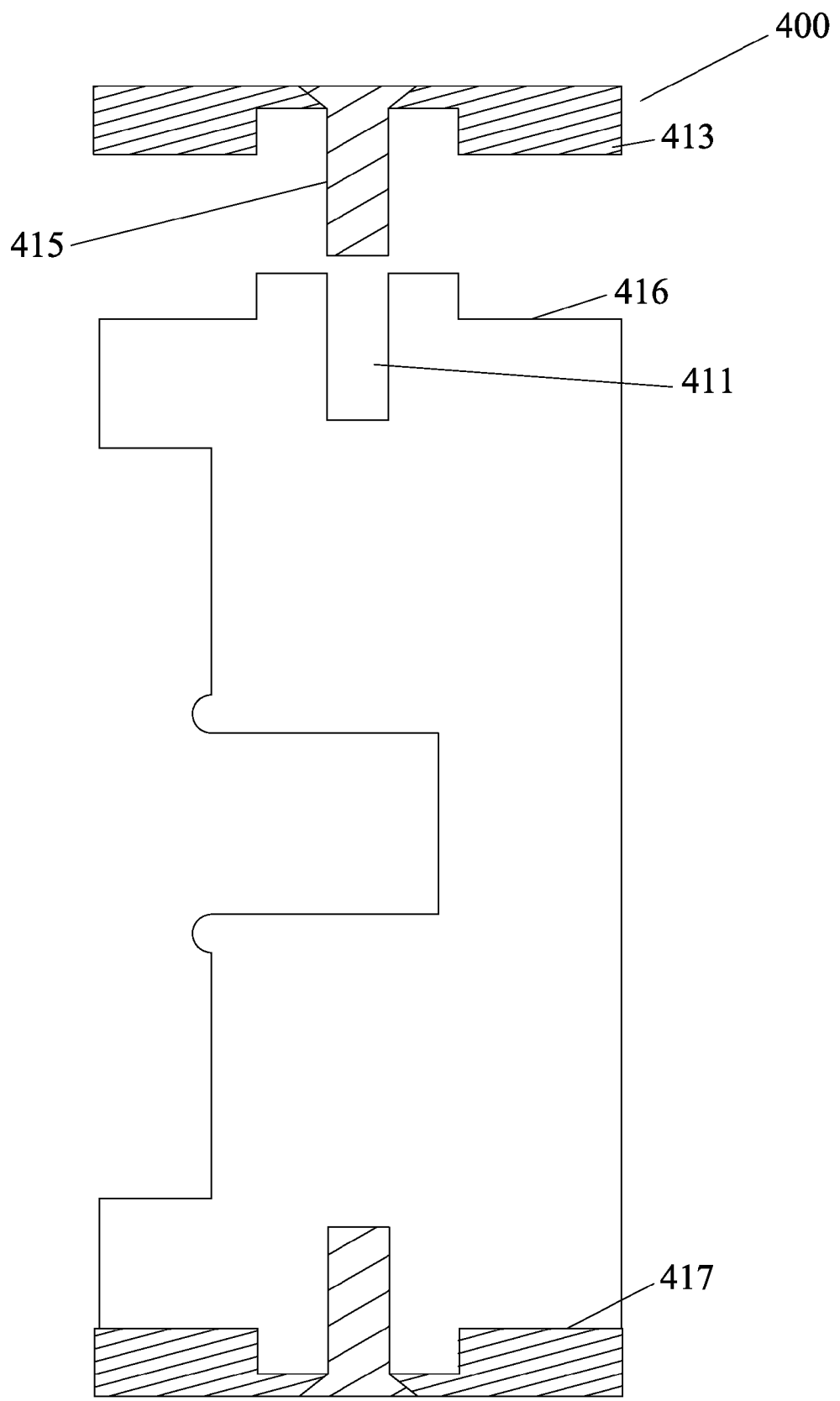
FIG. 5 is a schematic view of method for processing the second raw material into an annular component and a constraining component in the third embodiment of the present invention.

FIG. 5 is illustrated a schematic view of method for processing the second raw material into an annular component and a constraining component in the third embodiment of the present invention. The method for manufacturing a piston 4 differing from the method 3 is, the disc component 400 comprises an annular component 413 and a constraining component 415, wherein the constraining component 415 is riveted to the groove 411 tightly through the hole of the annular component 413, so as to mount the disc component 400 to the top surface 416 or the bottom surface 417. It is to be understood that the manufacturing methods of the third embodiment and the fourth embodiment are illustrated as examples, the invention is not limited to those precise embodiments, and that various other changes and modifications may be effected therein by one skilled in the art without departing from the scope or spirit of the invention.

To ensure the annular component rivet tightly to the piston, the method of manufacturing of a piston device further comprises a step of grinding the jointing surface of the disc component and the piston, for removing the burr of the jointing surface from the first embodiment to the fourth embodiment.

From illustrated above, the method of manufacturing a piston of the present invention rivets the annular component or the disc component to the piston tightly hence to realize the durable wearing object and purpose.

It is to be understood that the invention is not limited to those precise embodiments, and that various other changes and modifications may be effected therein by one skilled in the art without departing from the scope or spirit of the invention.

The invention claimed is:

1. A method for manufacturing a piston device, comprising the following steps of:
    processing a first raw material to form a piston with a top surface and a bottom surface, wherein either said top surface or said bottom surface has a convex portion;
    processing a second raw material to have the diameter of said second raw material slightly larger than the diameter of said piston;
    cutting said second raw material into a plurality of cylinders;
    drilling one of said plurality of cylinders to form an annular component; and
    mounting said annular component on said top surface or said bottom surface through said convex portion.

2. The method of claim 1, wherein said second raw material is made of Teflon.

3. The method of claim 1, further comprising a step of performing a roughness process for forming the rough surface surrounding said second raw material.

4. The method of claim 3, further comprising a step of spraying Teflon particles to the outer surface of said second raw material.

5. The method of claim 3, further comprising a step of dipping said second raw material into Teflon solution.

6. The method of claim 1, wherein said convex portion has a first end and a second end, said annular component has a first inner diameter and a second inner diameter, and said first inner diameter and said second inner diameter are corresponding to said first end and said second end respectively.

7. The method of claim 1, wherein the step of mounting said annular component to said top surface or said bottom surface through said convex portion is by riveting said annular component to said convex portion tightly.

8. The method of claim 1, further comprising the step of grinding the jointing surface of said annular component and said piston for removing the burr of said jointing surface.

\* \* \* \* \*